United States Patent
Bill

(10) Patent No.: US 7,634,867 B2
(45) Date of Patent: Dec. 22, 2009

(54) BOBBING WATERFOWL DECOY

(75) Inventor: Robert G. Bill, 84 Sterling Hill Rd., Lyme, CT (US) 06371

(73) Assignee: Robert G. Bill, Lyme, CT (US)

( * ) Notice: Subject to any disclaimer, the term of this patent is extended or adjusted under 35 U.S.C. 154(b) by 239 days.

(21) Appl. No.: 11/686,558

(22) Filed: Mar. 15, 2007

(65) Prior Publication Data

US 2008/0222938 A1 Sep. 18, 2008

(51) Int. Cl.
*A01M 31/06* (2006.01)

(52) U.S. Cl. .................................. 43/3; 43/2

(58) Field of Classification Search ........ 43/2, 43/3

See application file for complete search history.

(56) References Cited

U.S. PATENT DOCUMENTS

| | | |
|---|---|---|
| 2,443,040 A | 6/1948 | Jones |
| 2,814,146 A | 11/1957 | Propp |
| 4,322,908 A | 4/1982 | McCrory |
| 4,612,722 A | 9/1986 | Ferrell |
| 5,775,022 A | 7/1998 | Sumrall |
| 5,930,936 A | 8/1999 | Parr |
| 6,070,356 A | 6/2000 | Brint |
| 6,088,944 A | 7/2000 | Jones |
| 6,170,188 B1 * | 1/2001 | Mathews ................ 43/3 |
| 6,212,816 B1 * | 4/2001 | Babbitt et al. ............ 43/3 |
| 6,321,480 B1 | 11/2001 | Solomon |
| 6,339,894 B1 * | 1/2002 | Solomon ................ 43/3 |
| 6,553,709 B1 | 4/2003 | Owen |
| 6,574,903 B2 | 6/2003 | Solomon |
| 6,601,333 B2 | 8/2003 | Cicoff |
| 2002/0152666 A1 | 10/2002 | Solomon |
| 2005/0091904 A1 | 5/2005 | Sullivan |
| 2005/0204604 A1 * | 9/2005 | Noles et al. ............. 43/2 |
| 2006/0143968 A1 | 7/2006 | Brint |

* cited by examiner

*Primary Examiner*—David J Parsley

(57) ABSTRACT

A waterfowl decoy for positioning at the surface of a body water, the waterfowl decoy comprising: a waterfowl decoy body, with a head and neck region, a front breast perimeter and a bottom surface; a drivetrain arranged generally orthogonally to the bottom surface of the waterfowl decoy body, the drivetrain comprising: an electric motor located generally in the head and neck region of the waterfowl decoy body; an output shaft in operable communication with the electrical motor; a disc shaped paddle in communication with the output shaft, the disc shaped paddle arranged generally parallel to the bottom surface of the waterfowl decoy bottom; a keel attached to the bottom of the waterfowl decoy body; a battery located within the keel, and in communication with the electric motor; and a central processing unit located with in the keel, and in operable communication with the battery and signal communication with the electric motor.

2 Claims, 6 Drawing Sheets

BOBBING WATERFOWL DECOY

TECHNICAL FIELD

The present invention relates to waterfowl decoy devices generally, and specifically relates to waterfowl decoy devices that generate both movement and water agitation that mimic the actions of live waterfowl.

BACKGROUND

Waterfowl decoy devices have been in use since prehistoric times for the purpose of luring live waterfowl within range of the hunter for capture. There was very little development in decoys over the centuries other than improved morphological detail which was enhanced by the introduction of plastic molding during the 1940's. Historically it has been known that motion, which is a strong lure, can be imparted to decoys by the crude method whereby a hunter jerks a line attacked to decoys. This method is still practiced today because it is effective in an environment where there is no water current, little floating vegetation, and a stationary hunting blind. If these conditions do not exist, the decoy may quickly become fouled in vegetation and thus requires constant tending. This problem similarly impacts many mechanical decoys.

Because there is normally no motion or water disturbance in prior art decoy spreads, live waterfowl learn to avoid these artificial decoy spreads unless the hunter can employ some method to create motion, particularly late in the hunting season. This has created an impetus to develop realistic motion producing decoys to replace or supplement the string jerk method. Early innovations were crude devices, but with the advent of miniaturization and solid-state technology, the field of mechanical decoys has quickly expanded. Patents have been granted for waterfowl decoys that are propelled by water pumps, sculling paddles, and propellers. Patents have also been granted for waterfowl decoy motion produced by moving heads, splashing paddles, splashing wings, tilting bodies and eccentric weight movement. Also there is a variety of waterfowl decoys available with spinning wings that are mounted on floating platform, or stakes.

All the above decoy devices can be effective waterfowl lures because they produce motion, but each has deficiencies. The self-propelled devices often become entangled in floating vegetation and cease to function. The spinning wing variety are very effective on naive waterfowl, but are avoided as the hunting season progresses because the motion these devices produce is recognizably artificial by the birds. Many of these designs are delicate, and may require as much as 10 minutes for assembly and deployment. Finally, none are completely waterproof. Thus there is a need for a mechanical waterfowl decoy, that is durable, waterproof, easy to deploy, and produces a realistic motion and water ripples in floating vegetation.

SUMMARY

The disclosed invention relates to a waterfowl decoy for positioning at the surface of a body water, the waterfowl decoy comprising: a waterfowl decoy body, with a head and neck region, a front breast perimeter and a bottom surface; a drivetrain arranged generally orthogonally to the bottom surface of the waterfowl decoy body, the drivetrain comprising: an electric motor located generally in the head and neck region of the waterfowl decoy body; an output shaft in operable communication with the electrical motor; a disc shaped paddle in communication with the output shaft, the disc shaped paddle arranged generally parallel to the bottom surface of the waterfowl decoy bottom; a keel attached to the bottom of the waterfowl decoy body; a battery located within the keel, and in communication with the electric motor; and a central processing unit located with in the keel, and in operable communication with the battery and signal communication with the electric motor.

The disclosed invention also relates to a waterfowl decoy for positioning at the surface of a body water, the waterfowl decoy comprising: blow molded polyethylene waterfowl decoy body, with a head and neck region, a front breast perimeter, a bottom surface, and a slot in the bottom surface; a drivetrain arranged generally orthogonally to the bottom surface of the waterfowl decoy body, the drivetrain comprising: a drivetrain housing, with lower end; a housing flange attached to the drivetrain housing; an adaptor plate attached to the housing flange; a motor compartment attached to the housing flange; a reversible motor attached to the housing flange and located in the motor compartment; a motor output shaft in communication with the motor, the motor output shaft having a ground flat; two cone shaped seals located on the motor output shaft; a seal holder located between the two cone shaped seals; a leadscrew attached to the motor output shaft at the ground flat; threads with an aggressive pitch are located on the leadscrew; a leadscrew nut in translational communication with the leadscrew; the leadscrew nut having a top and bottom; a first shock O-ring mounted on the top of the leadscrew; a first shock O-ring mounted on the bottom of the leadscrew; a first spring in communication with the first shock O-ring and the seal holder; a second spring in communication with the second shock O-ring and an interior flange of the drivetrain housing; a threaded reducer attached to the tube; a disc shaped paddle attached to the threaded reducer; a keel with an extended member attached to the bottom surface via the slot, the keel having a front end and a rear end; a wire conduit located at the front end of the keel; a central processing unit located in the keel, the central processing unit in signal communication with the reversible motor; and a battery located adjacent to the central processing unit, the batter in operable communication with the central processing unit and the reversible motor.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

The present invention is designed to be highly visible as a lure for passing waterfowl.

Figure 1:
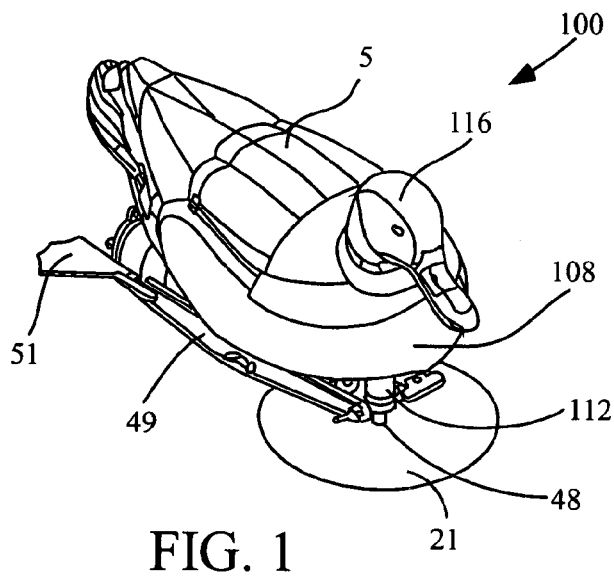
FIG. 1 shows a perspective view of the disclosed decoy.
Figure 2:
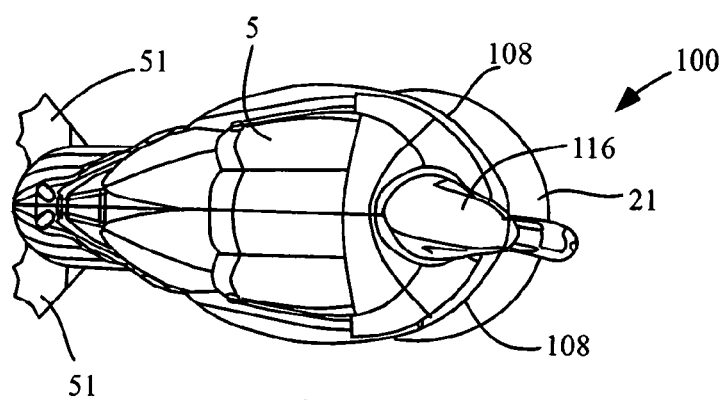
FIG. 2 shows a top view of the disclosed decoy.
Figure 3:
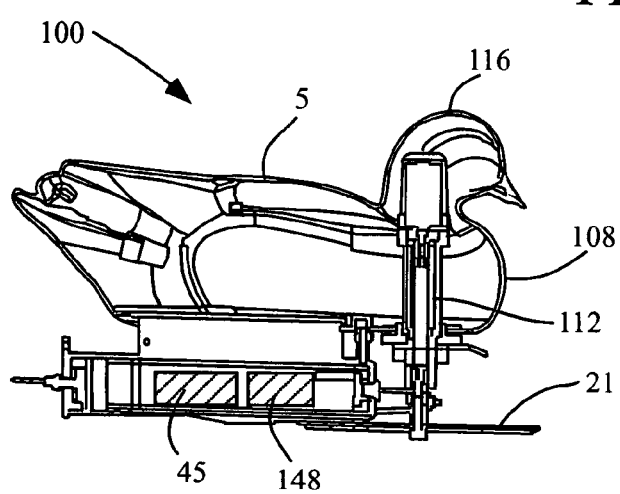
FIG. 3 shows a cross-sectional view of the decoy.

FIG. 1 shows a perspective view of the decoy 100. In one embodiment, the decoy 100 may use a "Magnum" type blow molded polyethylene decoy body 5. The decoy 100 will have a decoy head 116, a front breast perimeter 108, a drivetrain 112 between the decoy body 5 and a disc shaped paddle 21. An optional foot assembly comprising parts 48, 49, 50 and 51 will be discussed further below. FIG. 2 is a top view of the decoy. FIG. 3 is a side cross-sectional view of the decoy 100. Of course, the invention may be modified so that other waterfowl decoys may be used, such as swans, pelicans, various ducks and geese. The front breast perimeter 108 is additionally enlarged to give added buoyancy as compensation for the weight of the drivetrain 112. The front breast perimeter 108 is enlarged by about ¼ inch to about ¾ inch along a 1½ inch wide band.

Figure 4:
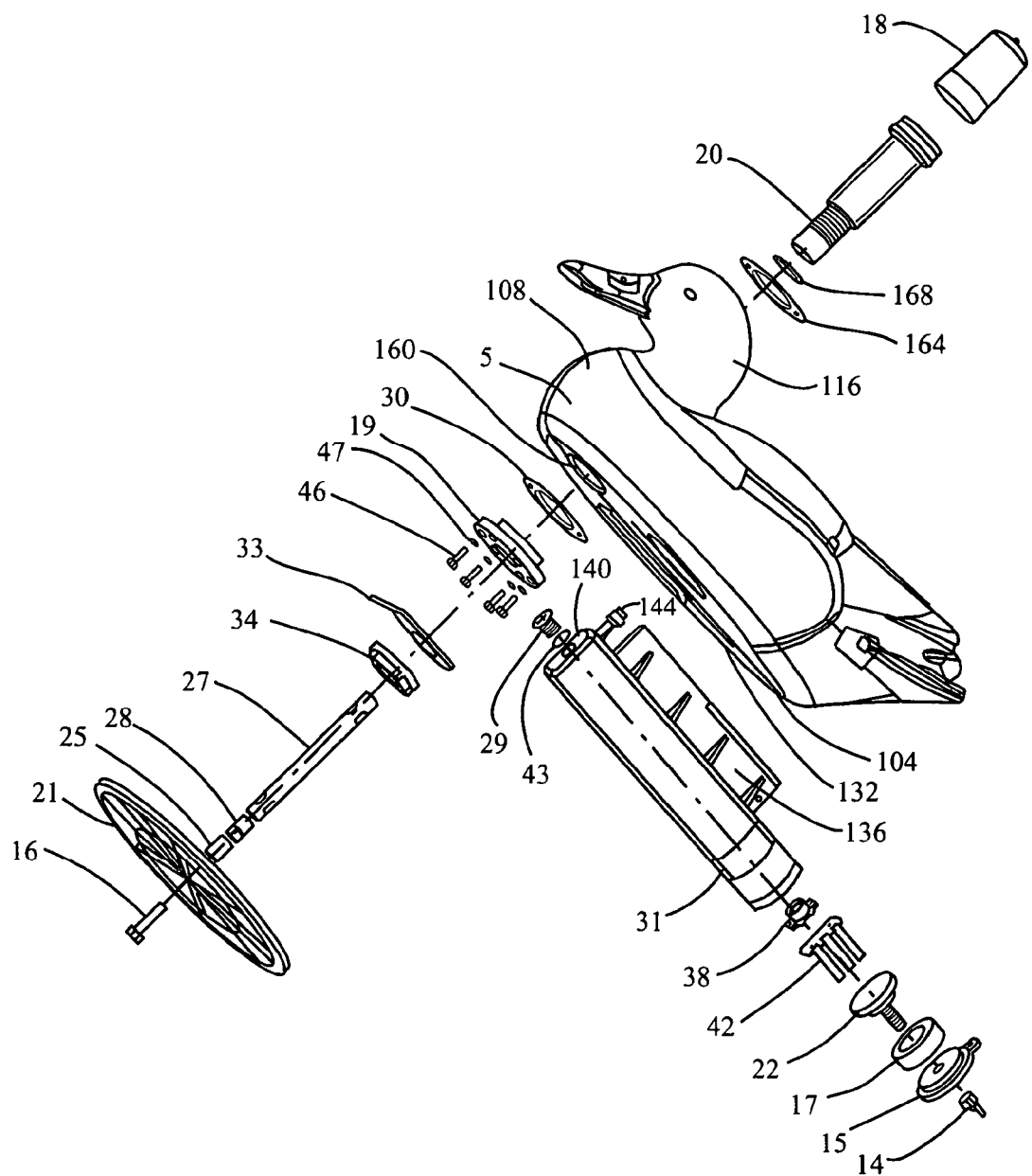
FIG. 4 shows an exploded view of the decoy assembly not including the internal drivetrain parts.
Figure 7:
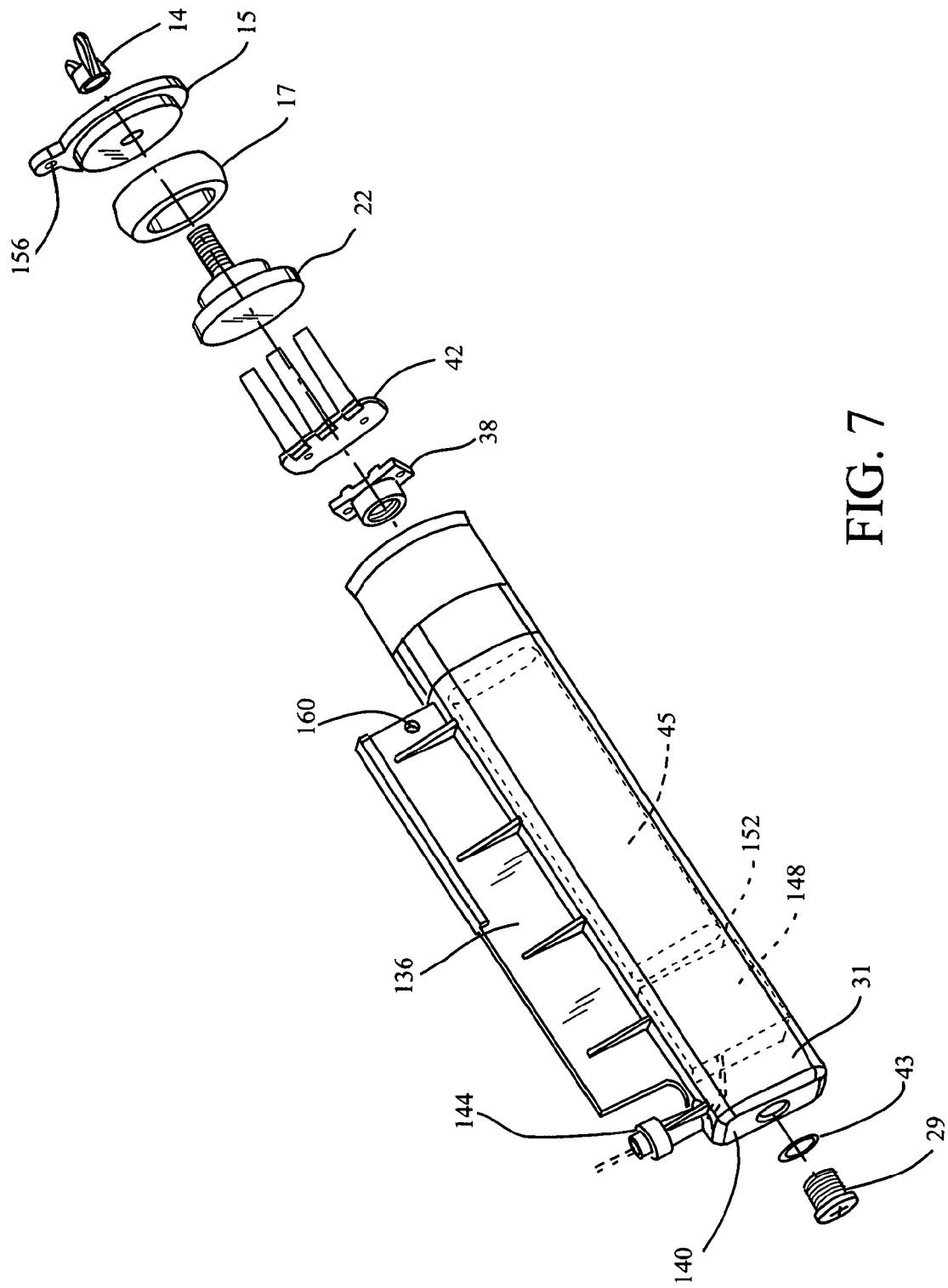
FIG. 7 shows a detailed exploded view of the keel assembly.

Referring now to FIG. 4, a polyethylene keel 31 is attached to the bottom 104 of the body 5. A slot 132 in the bottom 104 of the body 5 mates with the extended member 136 of the keel 31. The front 140 of the keel 31 is supplied with a wire conduit 144 that is attached to the keel 31 to achieve a waterproof joint. The attachment means may be by welding, gluing, or any other means of making the joint between the wire conduit 144 and the keel 31 waterproof. The wire conduit 144 is the pathway for a plurality of wires that energize the motor 36 (see FIG. 7) and the antenna wire (not visible in this view) located inside the decoy head 116. The wires (not shown) are in signal communication with blade shaped contacts 42 that are attached to a standoff bracket 38 that is secured in place below the wire conduit 144 by a screw 29 and O-ring 43. A central processing unit 148 is in signal communication with the blade shaped contacts 42. The central processing unit 148 is fully encapsulated. The interior of the keel 31 is fully encapsulated and waterproof. The central processing unit 148 may be designed with a duty cycle that alternately reverses the voltage to the motor 36 with an "ON" time of 0.25 seconds and an "OFF" time of 3.0 seconds as a means of conserving battery life (which may be about 15 hours, dependent on the battery selected). One of ordinary skill in the art will recognize that other duty cycles may be programmed into the central processing unit 148. An optional central processing unit, which would also include a radio receiver is available for remote ON/OFF operation. The posterior end 152 of the central processing unit 148 is provided with 2 spring loaded contacts on a slightly inclined ramp that mate with the contacts on a battery 45. The battery 45 may be rechargeable. One suitable battery would be a 9.6VDC Nimh battery. The battery 45 is also encapsulated in a waterproof plastic sleeve and provided with a nylon ribbon as a lanyard for ease of extraction from the keel 31. The battery orientation in the keel 31 can be reversed for storage in the "OFF" position. Because of the unreliability of exposed switches, the device 100 is energized by inserting the battery in the proper "ON" orientation prior to deployment. This procedure takes about 5 seconds. If so provided, the device 100 can also be activated by an optional transmitter that has a range of about 75 meters. Battery 45 insertion is followed by insertion of a watertight plug assembly that comprises a threaded plug 22, a rubber donut 17, washer 15, and wingnut 14. Tightening the wingnut 14 expands the rubber doughnut 17 in rear round section of keel 31. A short safety line may be attached to the hole 156 in the washer 15. The battery 45 may be brightly colored to aid in loss prevention.

Figure 5:
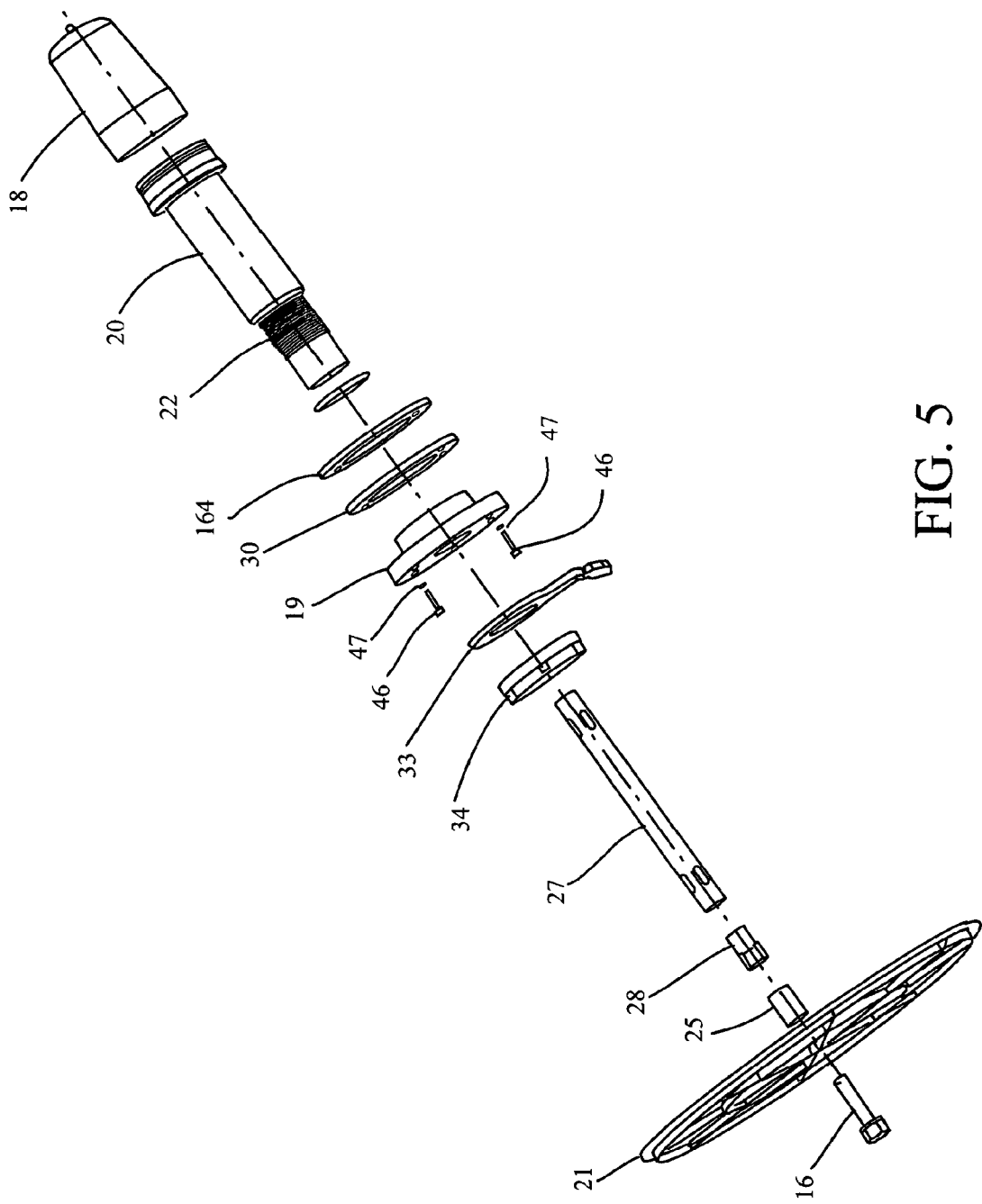
FIG. 5 shows a detailed exploded view of the drivetrain external parts.

The drivetrain assembly, see FIG. 5, attaches to the decoy body 5 by means of a waterproof flange 19 and gasket 30 through a hole directly under the head 116, and is secured with a plurality of O-ring 47 sealed screws 46 that thread into an aluminum backing plate 164 within the body 5. The drivetrain housing 20 threads onto the flange 19 with an O-ring seal 168, and the drivetrain housing 20 threads 212 also provide attachment for an anchor line cleat 33 and retaining nut 34 directly below the flange 19.

Figure 6:
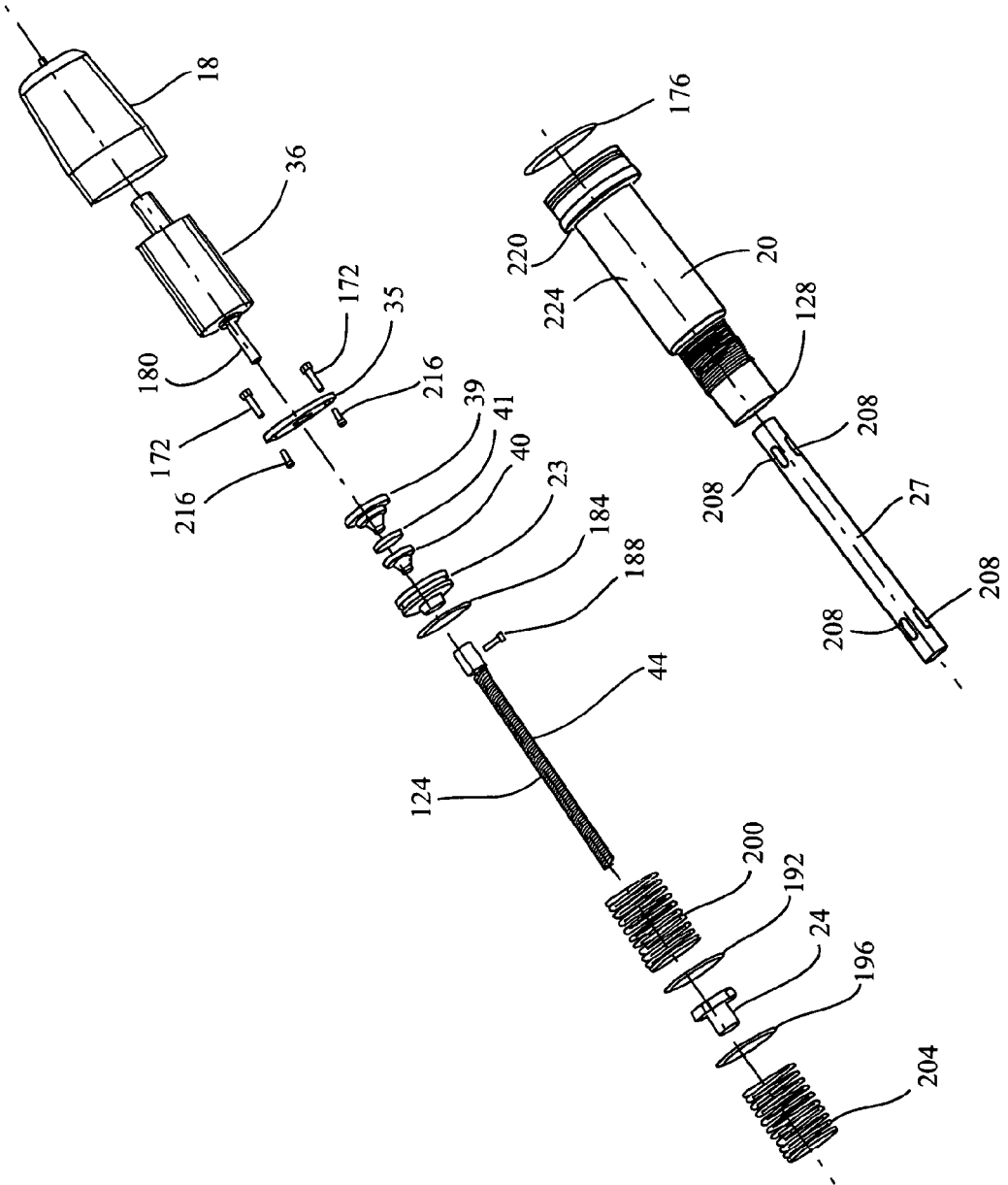
FIG. 6 shows a detailed exploded view of the drivetrain internal parts.

Referring now to FIG. 6, the drivetrain 112 is driven by a reversible motor 36. 2. The reversible motor may be a 9.6 VDC motor, or any other suitable motor. The motor 36 is mounted with motor screws 216 on an adapter plate 35. The adapter plate 35 may be made out of a light weight material, such as but not limited to aluminum. Additional screws 172 are used to mount the adapter plate 35 to the flange 220 near the top of the drivetrain housing 20. Holes fitted with O-ring seals (not visible in this view) are located in the housing flange 220 and adapter plate 35 to provide a waterproof seal around the wires that provide power to the motor 36. The motor compartment 18 and motor compartment O-ring 176 mate with the housing flange 220 to provide a watertight motor compartment 18 interior. The motor output shaft 180 is made of a non-rust material, such as but not limited to stainless steel, and passes through 2 cone shaped neoprene seals 39, 40 separated by a spacer 41. These parts are contained within a seal holder 23 that is held in place at the top of the housing 20 by a seal holder O-ring 184 and the adapter plate 35. The seal holder 23 may be made out of plastic or any other suitable material. The end of the output shaft 180 has a ground flat for attachment of a leadscrew 44 with an allen head set screw 188. Of course the invention may be configured to use other types of set screws, not just allen head. The leadscrew 44 may be made out of any suitable rustproof material, including but not limited to stainless steel. The leadscrew 44 is machined with 5 starts (threads) having an aggressive pitch on the leads that advance the leadscrew nut 24 about 9 mm of linear travel per revolution of the screw. Full travel of the nut 24 (about 7 revolutions of the screw) is accomplished in about 0.25 seconds before reversing about 3 seconds later, a function governed by the central processing unit 148. The axial shock of the nut 24 bottoming out at the end of each stroke is reduced by shock O-rings 192, 196 mounted on the top (192) and bottom (196) of the nut 24 and rustproof springs 200, 204 mounted top (200) and bottom (204). The springs 200, 204 may be made out of any suitable rustproof material such as stainless steel, plastic, etc. The springs 200, 204 and O-rings 192, 196 also reduce mechanical noise, with the residual noise resembling the quiet guttural quacks of feeding waterfowl. This noise may enhance the devices luring properties, but in no way alarms waterfowl that land in close proximity.

The drivetrain housing 20 may be molded plastic. the shape of the drivetrain housing 20 is generally cylindrical. The drivetrain housing 20 is constructed with a flange 220 near the top of the housing 20 with screw and wire holes (not visible) that provides both a mounting surface for the adapter plate 20, an internal pocket (not shown) for the seal holder 23, and an O-ring seal for the motor compartment 18. The interior of the elongated section 224 of the drivetrain housing 20 also has at least one track that serves as a guide to prevent the leadscrew nut from turning while being driven up and down by the leadscrew 44, a recessed spring seat for spring 204, and a spring seat below the seal housing 23 for spring 200. The bottom 128 of the housing 20 includes a splined shaped internal orifice as an exit for tube 27, and an external threaded shaft for attachment of the waterproof flange 19, anchor cleat 33 and retaining nut 34.

The tube 27 is threaded to the bottom of the leadscrew nut 24 to provide space for the leadscrew 44 when the nut 24 is driven up. The tube 27 exits the housing 20 through the bottom spline orifice of the housing 20 located at the bottom 128 of the housing. Slotted ports 208 are machined in both the top and bottom of the tube. The tube ports 208 and lower housing splined orifice provide water passages and reduce hydrostatic pressure against the motor seals. All the internal drivetrain parts below the seal holder 23 may be exposed to surrounding water.

Referring now to FIG. 5, a threaded reducer 28 is attached to the bottom of the tube 27 and is configured to attach to a disc shaped paddle 21 by means of a paddle screw 16 and a bushing 21. The threaded reducer 28, and paddle screw 16 may be made out of any suitably flexible material, including nylon, plastic, metal. The reducer 28 also provides a mounting point for an optional device with moving feet, shown in FIGS. 1 and 8. The screw 16 and bushing 25 provide a flexible link between the rigid tube 27 and the paddle 21 as a precaution against drivetrain damage. This allows the device to be stored along with conventional decoys without damage to the drivetrain, eliminating assembly prior to deployment.

Figure 8:
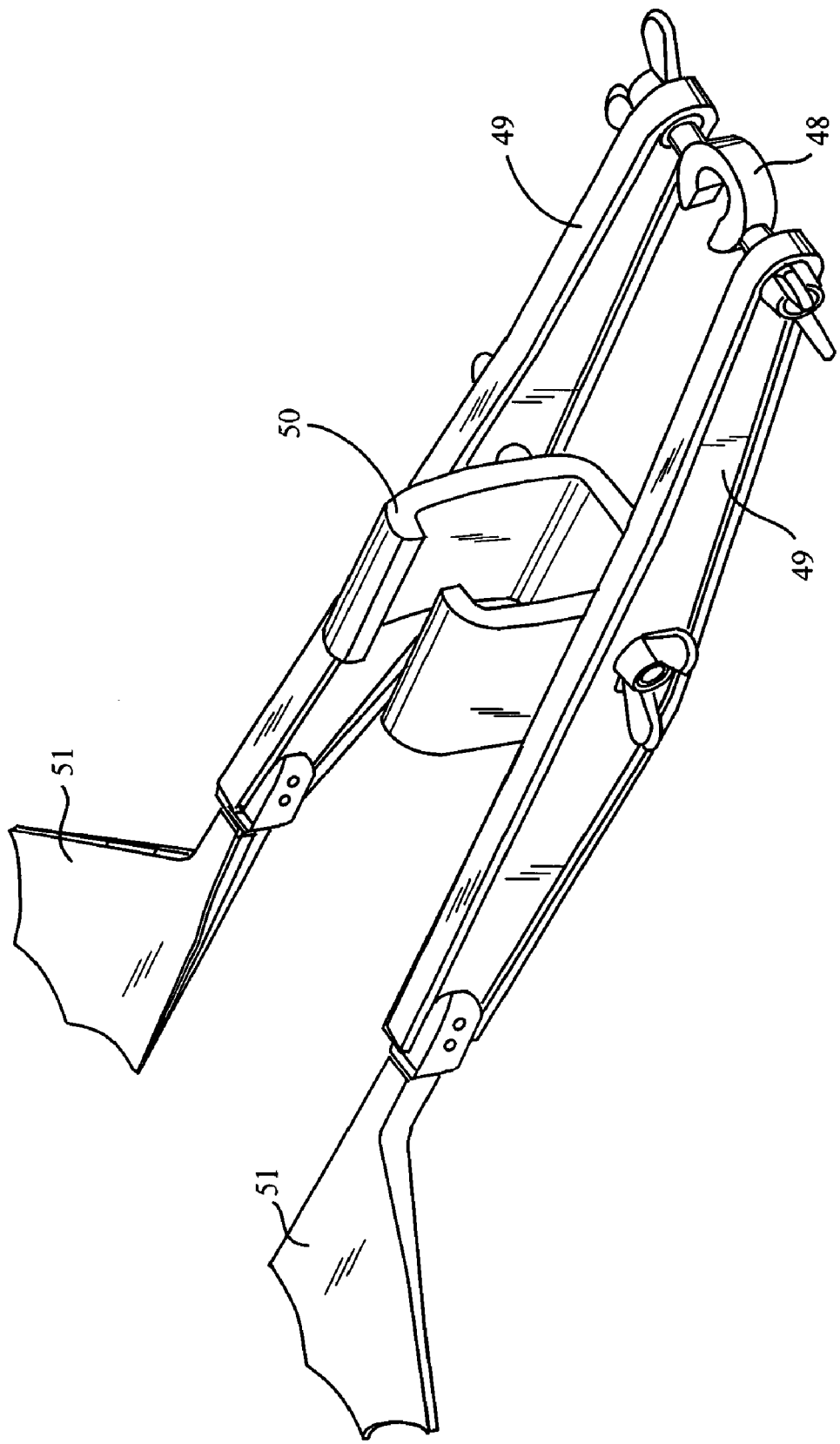
FIG. 8 is a perspective view of the foot assembly.

Referring to FIGS. 1 and 8, an optional foot assembly can be added as an additional visual attractant. The foot assembly comprises a bayonet type clip 48 that mates with the threaded reducer 28 on the lower drivetrain that drives at least one lever 49 and attached foot 51 on each of the at least one levers 49. The lever 49 pivots about a fulcrum provided on a keel clip 50 (not visible in FIG. 1, visible in FIG. 8) that snaps onto the keel 31. The at least one foot 51 moves up and down and is entrained by the reciprocating drivetrain. The at least one foot 51 may be colored orange and is highly visible and produce additional ripples and movement when entering and leaving the water. The foot assembly is designed to easily snap into place without requiring tools.

Referring now to FIGS. 1-3, the platform for the device 100 is a hollow blow-molded polyethylene decoy body 5 that conforms to a mallard drake, of course other waterfowl may be used as the platform, such as a goose, swan, pelican, or other ducks. The posterior portion 108 of the decoy body 5 is oversized to offset the weight of the drivetrain 112 located below the decoy head 116.

The drivetrain 112 is arranged in a tower formation and produces the up and down motion via the paddle 21 that creates the bobbing and resultant ripples while the device 100 is in the water. The top (nearer to the decoy head 116) of the drivetrain 112 contains a waterproofed 9.6 VDC reversible 5,500 rpm motor 36 (see FIG. 6) that drives an aggressive linear leadscrew 44. A set of seals 39, 40, 120 isolate the motor 36 from the lower portion of the drivetrain 112, the lower portion which includes the leadscrew 44, to preserve watertight integrity of the motor compartment 18. Within the drive train housing 20, a leadscrew nut 24 tracks up and down on the leadscrew threads 124 driven by the reciprocating motion of the motor 35 and leadscrew 44. A stainless steel tube 27, connected to the leadscrew nut 24, exits the lower end 128 of drivetrain housing 20 and transfers the motion of the reciprocating leadscrew nut 24 to a disc shaped paddle 21 below the decoy body 5. The paddle 21 produces the bobbing and ripples. The lower portion of the drivetrain 112 is exposed to surrounding water when the device is placed in the water.

A timing circuit and 9.6VDC rechargeable battery, which produce the reversing action of the motor, are located in the waterproof keel. The keel is attached to the decoy bottom posterior to the drivetrain and is sealed with an expanding plug. By using the keel to house the battery and circuit, a low center of gravity is gained, making the decoy self righting. This arrangement also provides protection to these vital components against shotgun pellets. Because of the unreliability of switches in an aquatic environment, the decoy is activated by inserting the battery, or by using an optional remote ON/OFF transmitter. An additional option is feet that move up and down on levers driven by the drivetrain. Both the timing circuit and battery are waterproofed. The expanding plug creates a watertight seal.

The device is designed as a rugged easy to deploy floating lure that creates a highly visible water ripple patterns produced by an up and down bobbing motion, which is more representative of true waterfowl movement. The ripples also assist in the retardation of ice formation within a 3 meter circle.

Because of the novel use of a leadscrew and nut to transfer rotational motion to linear motion, all parts listed for this device, except miscellaneous screws, are unique to this device and individually required engineering design and manufacture. In addition, all parts are sufficiently robust to withstand damage from stray shotgun pellets. Additionally, the waterproof characteristic of the circuit, battery, keel, and body are novel.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A waterfowl decoy for positioning at the surface of a body of water, the waterfowl decoy comprising:
    a blow molded polyethylene waterfowl decoy body, with a head and neck region, a front breast perimeter, a bottom surface, and a slot in the bottom surface;
    a drivetrain arranged generally orthogonally to the bottom surface of the waterfowl decoy body, the drivetrain comprising:
    a drivetrain housing, with a lower end;
    an exterior housing flange attached to the drivetrain housing and located exteriorly to the drivetrain housing;
    an adaptor plate attached to the exterior housing flange;
    a motor compartment attached to the exterior housing flange;
    a reversible motor attached to the exterior housing flange and located in the motor compartment;
    a motor output shaft in communication with the motor, the motor output shaft having a ground flat;
    two cone shaped seals located on the motor output shaft;
    a seal holder located between the two cone shaped seals;
    a leadscrew attached to the motor output shaft at the ground flat;
    threads with an aggressive pitch are located on the leadscrew;
    a leadscrew nut in translational communication with the leadscrew; the leadscrew nut having a top and bottom;
    a first shock O-ring mounted on the top of the leadscrew;
    a first shock O-ring mounted on the bottom of the leadscrew;
    a first spring in communication with the second shock O-ring and the seal holder;

a second spring in communication with the second shock O-ring and an interior flange of the drivetrain housing;
a threaded reducer attached to the tube;
a disc shaped paddle attached to a threaded reducer;
a keel with an extended member attached to the bottom surface via the slot, the keel having a front end and a rear end;
a wire conduit located at the front end of the keel;
a central processing unit located in the keel, the central processing unit in signal communication with the reversible motor; and
a battery located adjacent to the central processing unit, the batter in operable communication with the central processing unit and the reversible motor.

2. The waterfowl decoy of claim 1, further comprising:
a keel clip attached to the keel;
a bayonet type clip attached to the drivetrain;
a lever attached to the bayonet type clip and rotatable about the keel clip;
a foot attached to one end of the lever.

\* \* \* \* \*